US010657327B2

(12) United States Patent
Anders et al.

(10) Patent No.: US 10,657,327 B2
(45) Date of Patent: May 19, 2020

(54) DYNAMIC HOMOPHONE/SYNONYM IDENTIFICATION AND REPLACEMENT FOR NATURAL LANGUAGE PROCESSING

(71) Applicant: International Business Machines Corporation, Armonk, NY (US)

(72) Inventors: Kelley L. Anders, East New Market, MD (US); Paul R. Bastide, Boxford, MA (US); Stacy M. Cannon, Apex, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 15/665,759

(22) Filed: Aug. 1, 2017

(65) Prior Publication Data

US 2019/0042556 A1 Feb. 7, 2019

(51) Int. Cl.
*G06F 17/27* (2006.01)
*G06F 17/28* (2006.01)
(Continued)

(52) U.S. Cl.
CPC .......... *G06F 40/253* (2020.01); *G06F 40/166* (2020.01); *G06F 40/247* (2020.01);
(Continued)

(58) Field of Classification Search
CPC .................................................. G06F 17/273
(Continued)

(56) References Cited

U.S. PATENT DOCUMENTS 6,269,335 B1 * 7/2001 Ittycheriah .............. G10L 15/22
704/239
6,282,507 B1 * 8/2001 Horiguchi ............. G06F 17/271
345/171
(Continued)

FOREIGN PATENT DOCUMENTS

WO WO00/60560 10/2000

OTHER PUBLICATIONS

Anonymous, "Customization of Text Messaging Using Historical Patterns to Improve Comprehension", IP.com Prior Art Database Technical Disclosure, IP.com No. IPCOM000239254D, Oct. 23, 2014, 4 pages.
(Continued)

*Primary Examiner* — Paras D Shah
*Assistant Examiner* — Timothy Nguyen
(74) *Attorney, Agent, or Firm* — Stephen J. Walder, Jr.; Alexander G. Jochym

(57) ABSTRACT

Mechanisms are provided for clarifying homophone usage in natural language content. The mechanisms analyze natural language content to identify a homophone instance in the natural language content, the homophone instance being a first term having a first definition and a first pronunciation for which there is a second term having the first pronunciation and a second definition different from the first definition. The mechanisms, in response to identifying the homophone instance, analyze the natural language content to identify a third term that is a synonym for the second term. The third term has a third definition that is nearly the same as the second definition. The mechanisms, in response to the natural language content comprising the third term, perform a clarifying operation to modify the natural language content to clarify the homophone instance and generate a modified natural language content.

14 Claims, 6 Drawing Sheets

(51) Int. Cl.
*G06F 17/24* (2006.01)
*G10L 13/02* (2013.01)
*G06F 40/253* (2020.01)
*G06F 40/30* (2020.01)
*G06F 40/56* (2020.01)
*G06F 40/166* (2020.01)
*G06F 40/247* (2020.01)
*G06F 40/284* (2020.01)

(52) U.S. Cl.
CPC ............ *G06F 40/284* (2020.01); *G06F 40/30* (2020.01); *G06F 40/56* (2020.01); *G10L 13/02* (2013.01)

(58) Field of Classification Search
USPC .......................................................... 704/9
See application file for complete search history.

(56) References Cited

U.S. PATENT DOCUMENTS

| | | | |
|---|---|---|---|
| 7,376,938 | B1 | 5/2008 | Van der Hoeven |
| 7,539,619 | B1* | 5/2009 | Seligman ............ G06F 17/2755 704/2 |
| 7,587,308 | B2 | 9/2009 | Kasravi et al. |
| 8,275,803 | B2 | 9/2012 | Brown et al. |
| 2002/0173946 | A1* | 11/2002 | Christy ............... G06F 17/2872 704/2 |
| 2006/0116877 | A1* | 6/2006 | Pickering ................ G10L 15/08 704/231 |
| 2009/0204386 | A1* | 8/2009 | Seligman ............ G06F 17/2755 704/2 |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2012/0035924 | A1* | 2/2012 | Jitkoff ................ G01C 21/3608 704/235 |
| 2012/0089400 | A1* | 4/2012 | Henton ................... G10L 13/02 704/260 |
| 2012/0303371 | A1* | 11/2012 | Labsky ................... G10L 13/08 704/260 |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0325442 | A1* | 12/2013 | Dahlmeier ............ G06F 17/274 704/9 |
| 2013/0346434 | A1* | 12/2013 | Shazeer ................ G06F 17/273 707/759 |
| 2015/0032443 | A1* | 1/2015 | Karov ................ G06F 17/2785 704/9 |
| 2016/0357731 | A1* | 12/2016 | Zorzin ................ G06F 17/2785 |

OTHER PUBLICATIONS

Bouillon, Pierrette et al., "Two Approaches to Correcting Homophone Confusions in a Hybrid Machine Translation System", Proceedings of the Second Workshop on Hybrid Approaches to Translation, Aug. 8, 2013, pp. 109-116.

High, Rob, "The Era of Cognitive Systems: An Inside Look at IBM Watson and How it Works", IBM Corporation, Redbooks, Dec. 12, 2012, 16 pages.

IBM, "Checking for ambiguous references within written text", IP.com Prior Art Database Technical Disclosure, IP.com No. IPCOM000167268D, Feb. 5, 2008, 3 pages.

McCord, M.C. et al., "Deep parsing in Watson", IBM J. Res. & Dev. vol. 56 No. 3/4 Paper 3, May/Jul. 2012, pp. 3:1-3:15.

Pittke, Fabian et al., "Automatic Detection and Resolution of Lexical Ambiguity in Process Models", IEEE Transactions on Software Engineering, vol. X, No. X, Jan. 2015, 21 pages.

Shinnou, Hiroyuki, "Detection of Japanese Homophone Errors by a Decision List Including a Written Word as a Default Evidence", Proceedings of the ninth conference on European chapter of the Association for Computational Linguistics (EACL) '99, Jun. 8-12, 1999, pp. 180-187.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

DYNAMIC HOMOPHONE/SYNONYM IDENTIFICATION AND REPLACEMENT FOR NATURAL LANGUAGE PROCESSING

BACKGROUND

The present application relates generally to an improved data processing apparatus and method and more specifically to mechanisms for performing dynamic homophone/synonym identification and replacement in a natural language processing mechanism.

Natural language processing (NLP) is a field of computer science, artificial intelligence and computational linguistics concerned with the interactions between computers and human (natural) languages, and, in particular, concerned with programming computers to fruitfully process large natural language corpora. Challenges in natural language processing frequently involve natural language understanding, natural language generation (frequently from formal, machine-readable logical forms), connecting language and machine perception, dialog systems, or some combination thereof.

Most NLP systems were based on complex sets of hand-written rules, however, in the late 1980s, a revolution in NLP occurred with the introduction of machine learning algorithms for language processing. Some of the earliest-used machine learning algorithms, such as decision trees, produced systems of hard if-then rules similar to existing hand-written rules. Part of speech tagging introduced the use of hidden Markov models to NLP, and increasingly, research has focused on statistical models, which make soft, probabilistic decisions based on attaching real-valued weights to the features making up the input data. The cache language models upon which many speech recognition systems now rely are examples of such statistical models. Such models are generally more robust when given unfamiliar input, especially input that contains errors (as is very common for real-world data), and produce more reliable results when integrated into a larger system comprising multiple subtasks.

Many of the notable early successes occurred in the field of machine translation, due especially to work at International Business Machines (IBM) Corporation, of Armonk, N.Y., where successively more complicated statistical models were developed. Recent research, both at IBM and by others, has increasingly focused on unsupervised and semi-supervised learning algorithms. Such algorithms are able to learn from data that has not been hand-annotated with the desired answers, or using a combination of annotated and non-annotated data. Generally, this task is much more difficult than supervised learning, and typically produces less accurate results for a given amount of input data. However, there is an enormous amount of non-annotated data available (including, among other things, the entire content of the World Wide Web), which can often make up for the inferior results.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to specifically configure the processor to implement a homophone/synonym identification/replacement (HSIR) engine. The method comprises analyzing, by the HSIR engine executing on the processor of the data processing system, natural language content to identify a homophone instance in the natural language content, the homophone instance being a first term having a first definition and a first pronunciation for which there is a second term having the first pronunciation and a second definition different from the first definition. The method also comprises, in response to identifying the homophone instance, analyzing, by the HSIR engine, the natural language content to identify a third term that is a synonym for the second term. The third term has a third definition that is nearly the same as the second definition. Moreover, the method comprises, in response to the natural language content comprising the third term, performing, by the HSIR engine, a clarifying operation to modify the natural language content to clarify the homophone instance and generate a modified natural language content.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
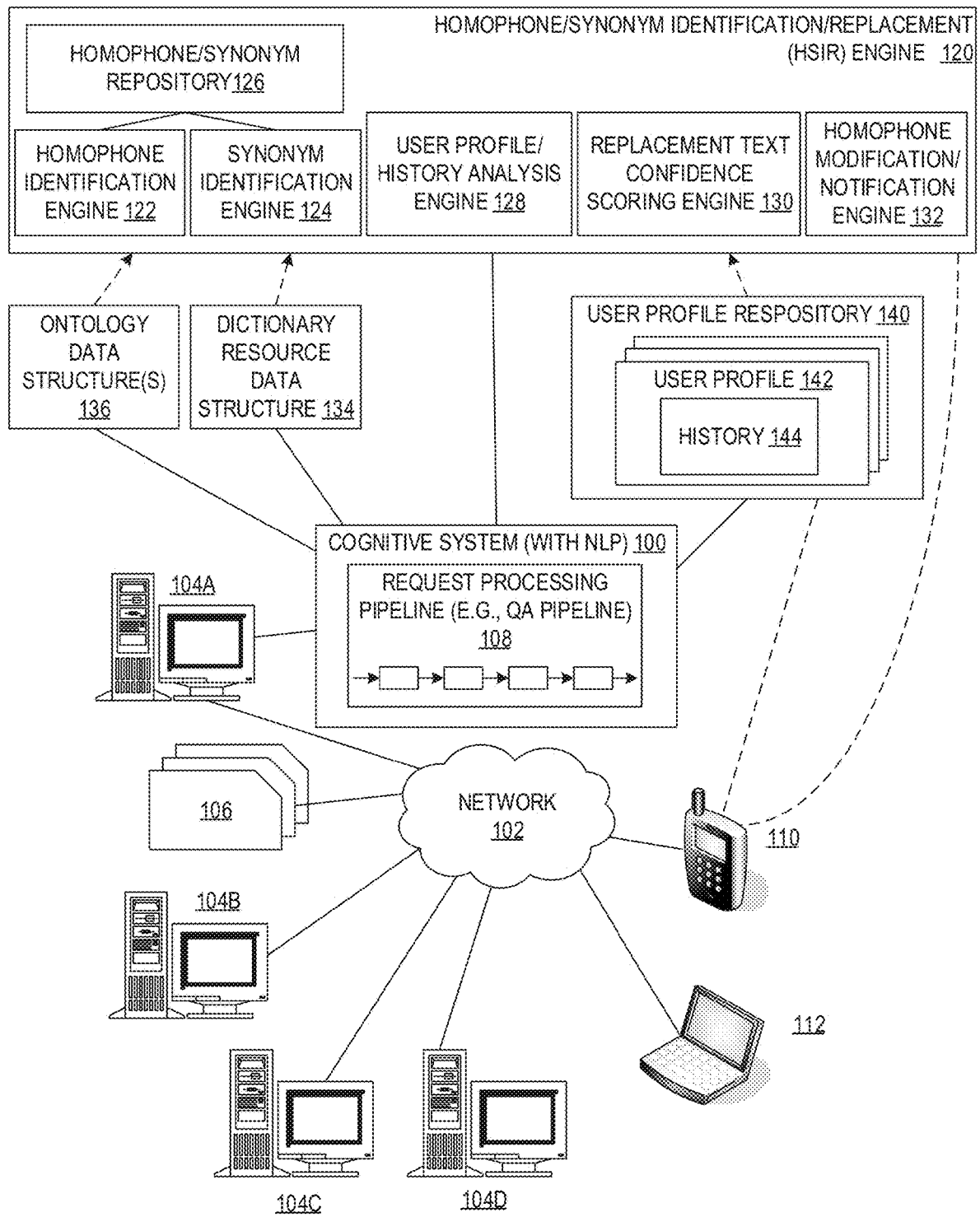
FIG. 1 depicts a schematic diagram of one illustrative embodiment of a cognitive system in a computer network.

The illustrative embodiments provide mechanisms for performing dynamic homophone/synonym identification and replacement in a natural language processing mechanism. As is generally known in the art, a homophone is a word pronounced the same as another but differing in meaning, whether spelled the same way or not, such as "heir" and "air." A synonym is a word having the same, or nearly the same, meaning as another in the language, such as "happy," "joyful," or "elated."

In order for natural language processing mechanisms to be able to satisfactorily extract meaning from natural language content, it is important for the natural language processing mechanisms to be able to determine the meaning of homophones within the natural language content. For example, consider a system in which spoken words are converted to natural language textual content which is then the subject of natural language processing. If a person speaks the word "heir", it is possible that the speech to text conversion may interpret that spoken word to be a homophone, e.g., "air," instead of the word intended by the speaker. Thus, when later performing natural language processing on the generated text, the natural language processing mechanism may generate an incorrect result or not be able to generate a result at all since the spoken word was mistakenly interpreted to be the incorrect homophone and have an incorrect meaning.

Similar considerations may apply to other areas where homophones may be erroneously identified to be one word when another word (homophone) was intended. For example, when translating natural language textual content from one language to another, sometimes homophones are incorrectly identified and result in an incorrect translation. This may occur with transcriptions, close captioning, user generated texts, and the like. Moreover, this may occur with colloquialisms, such as the meaning of the term "wicked" in Boston, Mass. (e.g., "cool", "really good", or "great") versus the meaning of the term "wicked" in Durham, N.C. (e.g., "evil").

The illustrative embodiments provide mechanisms for improving the understanding, comprehension, and translation of natural language content by identifying occurrences within natural language textual content of homophones and then processing these occurrences to determine the correct meaning of the homophone regardless of the homophone instance actually utilized, e.g., if the word is "sail", which is a homophone of the word "sale", regardless of which instance of "sail" or "sale" used, the correct homophone for the context of the natural language content is determined and appropriate action is performed to clarify the natural language textual content.

In order to clarify the homophone instances, the mechanisms of one or more of the illustrative embodiments compare all the possible homophone meanings, such as may be specified by associated synonym lists, against other words in the surrounding text to determine if they match the meaning or associated synonym. Thus, for example, the meanings, as indicated by associated synonyms, of both "sail" and "sale" may be compared against other words used in the same portion of natural language content where the homophone is detected. If a pairing is identified, the mechanisms of the illustrative embodiment may take a corresponding appropriate action to clarify the instance of the homophone in the natural language content based on the identified pairing. In some illustrative embodiments, this clarifying action may be to simply highlight the homophone and indicate the suggested alternative term, phrase, or n-gram for the original homophone instance. In other illustrative embodiments, if the original homophone instance is determined to be incorrect, such as by evaluating whether there is a synonym for that homophone in the natural language content, this clarifying action may comprise generating an output indicating the definition or meaning of the instance of the homophone used and indicating a potential incorrect usage of the homophone instance, e.g., "the term "sail" means to "pilot a water going vessel" and may be an incorrect usage in this instance."

In some illustrative embodiments, this may comprise replacing the identified instance of the homophone with replacement textual content that clarifies the meaning of the homophone. In some illustrative embodiments, this replacement may be to replace the homophone with another word, or n-gram, that does not have a definition or meaning similar to the other homophone and other word pairing found to be present in the natural language content. For example, if the original natural language content were the sentence "Add some of these ingredients together," the term "some" has a homophone of "sum". The term "add" is a synonym for the homophone "sum". Thus, when clarifying the homophone "some" in the original natural language content, a different term or n-gram that is a synonym for "some" is selected that is not a synonym for "sum" or "add", e.g., the term "several" may be used such that the modified natural language content may read "Add several of these ingredients together."

In some illustrative embodiments, the clarifying action may comprise providing metadata that may or may not, depending on the particular embodiment, be displayed to a user that indicates the definition (or meanings) of the homophone used in the natural language content, and other homophones and their definitions (or meanings) that may be used in place of the homophone actually used. In some illustrative embodiments, the homophone with the highest probability of correctness may be highlighted or otherwise indicated in the display, based on a determination of the pairings as noted above. In the case of a displayed set of homophones and definitions, a user selection may be facilitated such that the user may select which homophone is the correct one to use.

In some illustrative embodiments, the clarifying action may be to convert the natural language content to an audible output, such as converting text to speech, and outputting the audible output to a user. This may be done for each potential homophone of the particular term utilized in the natural language content. For example, using the example sentence "The car rode down the street", where "rode" is a homophone for "road" and the homophone "road" is a synonym for "street", both the sentence "The car drove down the street" and "The car travel surface down the street" may be output for selection of the correct version of the sentence that the user intends. In some illustrative embodiments, rather than outputting the audible output of alternatives of the sentence using replacement text for the term where the replacement text corresponds to different homophones, the audible output may instead be an audible output of proper usage examples of the actual term (homophone) used in the original natural language content, e.g., for the sentence "The car rode down the street", other sentences in which the term "rode" is properly used may be output, e.g., "the boy rode his bike", "the jockey rode the race horse", "the train rode along the railroad track," etc.

In some illustrative embodiments, in addition to the context of the natural language content in which the original (first) homophone instance is identified, the illustrative embodiment may utilize supplemental author specific information to determine a "best replacement" for the original (first) homophone instance identified in the original natural language content. That is, after determining that an original (first) homophone instance is present in the natural language content, and determining pairings of other (second) homophones, of the original (first) homophone instance, with other terms in the context of the natural language content, if any, to thereby eliminate potential (second) homophones from consideration for using replacement text to clarify the original (first) homophone instance, the illustrative embodiments may utilize supplemental author specific information to select from the candidate replacement texts for homophones that do not have the synonym pairing relationship of the identified pairs of other (second) homophones with terms in the context of the natural language content.

The supplemental author specific information is information about, or associated with, the author of the natural language content in which the homophone is detected and may come from a variety of different sources. For example, this supplemental information may comprise current location information for the author, which may be determined dynamically from a global positioning system or other location determination system, such as is generally available in mobile computing devices, from a user's profile indicating their home address, home country, or other geographical location of particular importance to the author, or the like. This supplemental information may also comprise user profile preferences that may be registered in a user profile associated with the author and a particular device, computing application, computing service, social networking website, or any other source of user profiles. These preferences may indicate different types of dictionaries to be utilized when performing natural language processing of natural language content generated by the author.

Moreover, cognitive analysis of an author's writing style may be performed to augment a user's profile to identify words, phrases, or the like, that are more commonly utilized by the author, e.g., counts of terms and phrases may be maintained and used to compare against a threshold to determine which terms/phrases are more regularly used by the author as opposed to others. That is, a user history of terms/phrases utilized may be maintained and analyzed to identify the terms/phrases that the user prefers when generating natural language content and this information may be used to select corresponding replacement text for an identified instance of a homophone in natural language content generated by this user (author). The writing style may be analyzed further to identify which synonyms the user uses for similar contexts.

The author specific supplemental information may be compared against the potential candidate replacement texts for the original homophone instance to select a replacement text that matches or corresponds to some of the author specific supplemental information. In some cases, a scoring algorithm may be used to score different candidate replacement texts based on degrees of matching with the supplemental information and with the context of the original natural language content. This scoring provides a confidence in the replacement text as being correct replacement text for the original homophone instance that clarifies the intended meaning of the homophone and thus, may be referred to herein as a confidence score for the replacement text. The replacement text having the highest confidence score may be selected for use in replacement of the original homophone instance. Again, the replacement text may be used to actually replace the original homophone instance, highlight the original homophone instance and provide a suggestion as to clarifying text, provide an audible output to a user, or any of the possible clarifying actions previously discussed above.

The illustrative embodiments may operate dynamically as natural language content is being generated by a user. For example, the mechanisms of one or more o the illustrative embodiments may operate in conjunction with a "suggested next word" mechanism or alternative text suggestion mechanism that dynamically determines alternatives for words being entered by a user in real-time. In other illustrative embodiments, the operations may be performed on previously generated natural language content. For example, the operations may be performed as part of a "checker" mechanisms, such as a checker mechanism similar to a spell check mechanism.

Thus, the mechanisms of the illustrative embodiments provide functionality for identifying and clarifying homophone instances in natural language content. The identification itself may be performed based on knowledge bases of homophones for the particular natural language utilized in the natural language content. The clarifying of the homophone instances may be performed dynamically and automatically, or in some cases with the assistance of human approval and/or selection, based on an analysis of the context of the natural language content and its correspondence with different homophones for the original homophone instance. In some embodiments, supplemental information associated with the author of the natural language content may be utilized to further select the appropriate replacement text for an original homophone instance.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for performing dynamic homophone/synonym identification and replacement in a natural language processing mechanism. With the mechanisms of the illustrative embodiments, depending on the particular embodiment, natural language content entry is either monitored dynamically or checked after creation and storage of the natural language content, to determine if the natural language content includes homophone instances. If a homophone is determined to be present, the natural language content entry is monitored, or checked, to determine if there are any synonyms included in the natural language content for a homophone corresponding to the identified homophone instance. If a homophone synonym is detected to be present, the mechanisms of the illustrative embodiments determine a clarifying action to be performed on the natural language content to clarify the homophone instance that was identified in the natural language content.

In some illustrative embodiments, this clarifying action may be to identify and utilize a replacement or substitute term, phrase, n-gram, etc. (referred to collectively as replacement or substitute text) for the identified homophone instance that clarifies the natural language content, in order to generate modified natural language content that may then be stored and/or processed by natural language processing mechanisms to perform a cognitive operation. The replacement or substitute text may be selected based on various factors including user history information, user profile information, the context of the natural language content, etc. A confidence score may be calculated for each potential replacement or substitute text with the highest scoring potential replacement or substitute text being selected.

In other illustrative embodiments, various types of notifications, augmentations of the original natural language content, and the like, may be performed to clarify the original natural language content's use of the homophone. For example, various displays of clarifying content, or generation of metadata, may be performed so that a user, natural language processing system, or the like, are made aware of clarifying information that may be used to assist with understanding the use of the homophone in the context of the natural language content.

The illustrative embodiments may be utilized in many different types of data processing environments including, but not limited to, stand alone or distributed data processing systems for performing natural language processing, translation, cognitive operations being performed based on natural language content understanding, and the like. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for performing natural language processing of natural language content, which may be provided in one or more electronic corpora comprising electronic documents stored in one or more storage systems. In particular, the example embodiment is directed to a cognitive system that performs question answering and/or cognitive search operations. In the depicted example embodiment, the cognitive system implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system.

In the depicted example, the mechanisms of one or more of the illustrative embodiments may be utilized to clarify homophone usage in the documents of the one or more electronic corpora and/or in the request submitted to the cognitive system. While the illustrative embodiments will be described with regard to clarifying usage of homophones in requests/questions submitted by users and natural language content of stored documents of a corpus, it should be appreciated that the illustrative embodiments are not limited to such. Rather, the mechanisms of the illustrative embodiments may be utilized to clarify homophone usage in any portion of electronically rendered natural language content, regardless of source computing device or storage system. For example, the illustrative embodiments may be utilized with instant messaging systems, social networking web sites, word processing or other document authoring systems, text translation systems, educational software or systems, or the like.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. Moreover, each request processing pipeline may have their own associated corpus or corpora that they ingest and operate on. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a cognitive system. In other illustrative embodiments, other types of natural language processing systems and their associated analysis or processing mechanism may be augmented to include the homophone clarification mechanisms of one or more of the illustrative embodiments that are based on the identification of synonyms for homophones in the context of the natural language content in which the homophone instance is identified. As one or more embodiments may be implemented with the natural language processing mechanisms of a cognitive system, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for understanding natural language content, such as answering natural language questions posed to these cognitive systems using a Question Answering pipeline or system (QA system) and/or processing natural language requests, as well as processing natural language content of stored documents or portions of natural language content in one or more corpora.

In embodiments of cognitive systems involving question answering systems, the QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, subsystems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a homophone/synonym identification/replacement (HSIR) engine 120. The HSIR engine 120 comprises a homophone identification engine 122, a synonym identification engine 124, a homophone/synonym repository 126, a user profile/history analysis engine 128, a replacement text confidence scoring engine 130, and a homophone modification/notification engine 132. While these components are explicitly shown in FIG. 1, it should be appreciated that other non-depicted hardware/software components may be present as part of the HSIR engine 120 that assist in facilitating the operations of the depicted components, e.g., other communication interfaces, storage systems, cache systems, and the like.

The homophone identification engine 122 is specifically configured to perform operations for identifying instances of homophones in natural language content that is input to the HSIR engine 120 for processing by the HSIR engine 120. That is, the homophone identification engine 122 may parse the input natural language content, or utilize the results of parsing from the natural language processing mechanisms of the cognitive system 100, and compare the terms identified through the parsing to known homophones. The homophone identification engine 122 may utilize a pre-defined repository of homophone information, such as homophone/synonym repository 126, that identifies specific terms and maps or otherwise links these specific terms to their corresponding homophones, e.g., "sail" and "sale", "rode" and "road", "heir" and "air", etc., to facilitate this comparison. In addition, the homophone/synonym repository 126 may store a mapping of the homophone terms to synonyms for the respective homophone terms. Thus, taking the homophones "rode" and "road", a first set of recognizable synonyms may be associated with the term "rode", e.g., "drove, traveled, galloped, trotted, . . . " and a second set of recognizable synonyms may be associated with the term "road", e.g., "street, highway, thoroughfare, . . . " The homophone/synonym repository 126 may be used to perform such matching such that if a term matches one of the homophone terms in the repository 126 that term in the natural language content is determined to be a homophone instance and its synonyms, and associated homophones and their synonyms, may be retrieved from the repository 126.

The synonym identification engine 124 is specifically configured to be triggered by the identification of a homophone in the input natural language content, by the homophone identification engine 122, to look for synonyms of one or more of the associated homophones retrieved from the homophone/synonym repository 126. That is, the synonym lists for the homophone identified in the natural language content, and its corresponding other homophones, are used as a basis for matching against other terms in the natural language content, i.e. the context of the identified homophone instance. Any matches between terms in the natural language content and synonyms associated with homophones identified by the homophone identification engine 122 are identified by the synonym identification engine 124.

In response to detecting or identifying the presence of a synonym to a homophone in the natural language content, by the synonym identification engine 124, the homophone modification/notification engine 132 performs a clarification operation to clarify the identified homophone instance based on the particular synonym(s) identified in the natural language content. This clarification operation may take many different forms including, but not limited to:

(1) identifying replacement terms, phrases, n-grams, or the like, to replace the identified homophone instance with one or more words that more specifically identify the intended meaning of the identified homophone instance;

(2) modifying the original natural language content to replace the homophone instance with the replacement or substitute terms, phrases, n-grams, or the like;

(3) generating an output of one or more suggestions for modifying the natural language content to clarify the use of the homophone such that the suggestions may be user selectable and a user may select the correct one to be associated with the homophone instance;

(4) highlighting or otherwise outputting the homophone instance and/or associated homophones and/or synonym instances within the natural language content in a conspicuous manner so as to draw attention of a user and thereby prompt review/replacement of the homophone instance;

(5) automatically output an audible output of contextually accurate usage of the homophone instance and its corresponding other homophones to assist a user in understanding which homophone is the correct one for the context of the original natural language content; and/or (6) automatically output a definition of the homophone instance term and the definition of the other associated homophones.

It should be appreciated that these are only examples of the clarifying operations that may be performed using the mechanisms of the illustrative embodiments that operate on the identification of a homophone instance, corresponding other homophones, and synonyms in the original natural language content. Other clarifying operations that may become apparent to those of ordinary skill in the art in view of the present disclosure are intended to be within the spirit and scope of the present invention.

Taking one illustrative embodiment as an example, in this illustrative embodiment, the clarifying operation is to identify replacement text (e.g., one or more terms, phrases, n-grams, etc.) for the homophone instance based on the identifying of one or more synonyms for the homophone instance or associated homophones in the original natural language content. For purposes of ease of explanation, it will be assumed in the following examples that a single homophone instance is identified in natural language content, which in these examples is a single sentence of natural language content. However, it should be appreciated that the operations may be performed for any number of homophones and/or synonyms identified in a portion of natural language content.

With the mechanisms of this illustrative embodiment, in response to the homophone identification engine 122 identifying a homophone instance in the natural language content, as discussed above, the associated homophones and the associated synonyms for the homophone instance and associated homophones may be retrieved from a repository. The synonym identification engine 124 attempts to match the terms in the natural language content with synonyms of one or more of the homophone instance and the associated homophones retrieved from the homophone/synonym repository, e.g., homophone/synonym repository 126. If there is a match of a synonym of a homophone in the set of homophones (i.e. the original homophone instance (e.g., "sail") detected in the natural language content and its corresponding homophones (e.g., "sale")), then a corresponding pairing of synonym with homophone in the set of homophones is identified and the corresponding homophone is eliminated from consideration as a valid homophone for replacement of the original homophone instance. That is, only the homophones that do not have a pairing with a synonym in the natural language content are considered as potentially valid homophones for inclusion in the natural language content. Any homophones in the set of homophones may be eliminated in this way, including the originally identified homophone instance in the natural language content.

Thus, for example, assume that a portion of natural language content comprising the sentence "The car rode down the street" is input to the HSIR engine 120 for analysis to identify and clarify homophones that may be present in the natural language content. In this example, the original homophone instance "rode" is detected and is determined to have a corresponding homophone of "road" as indicated in the homophone/synonym repository 126. Thus, the set of homophones comprises the original homophone instance "rode" and the corresponding homophone "road". In addition, lists of synonyms associated with these two homophones are retrieved from the homophone/synonym repository 126, and the synonym identification engine 124 looks for matches of synonyms with terms in the natural language content. If there is a match, a corresponding pairing of the synonym with its associated homophone in the set of homophones is identified. In the above example, the term "street" in the natural language content is a synonym for the homophone "road" and thus, the pairing of "street" and "road" is identified.

If a pairing of a synonym in the natural language content to a homophone in the set of homophones is identified by the synonym identification engine 124, the corresponding homophone is eliminated from further consideration as a possible correct term to be used in the natural language content in replacement of the original homophone instance. Thus, in the above example, since the pairing of "road" with "street" is identified, the homophone "road" is eliminated from further consideration and the set of homophones is now left with just the original homophone instance of "rode".

Having identified the candidate homophones by eliminating from the set of homophones those that have pairings with synonyms in the natural language content, the candidate homophones may be evaluated to determine a replacement or substitute portion of text to replace, or substitute into the natural language content in place of, the original homophone instance. Essentially, a synonym or associated replacement clarifying text, which may likewise be stored in association with the homophone in the homophone/synonym repository 126, for example, for the candidate homophone may be used to replace the original homophone instance. It should be appreciated that there may be multiple possible synonyms or replacement texts to be considered for replacement or substitution of the original homophone instance. In some illustrative embodiments, a confidence scoring mechanism, such as the replacement text confidence scoring engine 130, may be utilized to select a particular one of the synonyms or replacement texts to utilize. The confidence scoring may be implemented in a variety of ways as will be described in greater detail hereafter.

In the above example, the only remaining homophone in the set of homophones is the original homophone instance of "rode". One synonym or replacement text for the homophone "rode" is "drove" which is then used by the homophone modification/notification engine 132 to modify the original natural language content to be "The car drove down the street" as opposed to the original "The car rode down the street." By replacing the homophone "rode" with "drove", the meaning of the original homophone instance is made clearer. This clarity assists with subsequent natural language processing and/or cognitive operations as any ambiguity that may exist with the fact that there was a homophone present in the natural language content is minimized by the clearer text.

In some instances, more than one possible candidate homophone, synonym, and/or replacement text may be present after the performance of the operations by the synonym identification engine 124 to identify the candidate homophones. Thus, a confidence scoring may be implemented to score the candidate homophones, synonyms, and/or replacement texts relative to one another and select a highest confidence replacement or substitute text for the original homophone instance. The replacement text confidence scoring engine 130 may perform operations for performing such confidence scoring and may look to both the context of the natural language content itself, as well as other information external to the natural language content, such as information maintained in user profile information associated with the user/author, history data structures indicating prior term usage by the user/author, location determination systems and/or data sources, and the like.

For example, confidence scoring may take into consideration subject matter associations of other terms in the context of the natural language content and their correlation to the candidate homophones and their associated synonyms and/or replacement text, e.g., the synonym "drove" for "rode" has associations with vehicles, such as the "car" mentioned in the example sentence "the car rode down the street." Such correlations of subject matter or concepts with terms may be determined using one or more ontology data structures 136 and searching such data structures for matching terms with regard to both the candidate homophone and its synonyms/replacement texts and the terms in the original natural language content. Thus, by correlating conceptually related terms in the context of the natural language content with candidate homophones and their associated synonyms and/or replacement texts, higher confidence scores may be given to synonyms and/or replacement texts that have a correlation with other concepts mentioned in the natural language texts.

As another factor in generating a confidence score for candidate homophones and their associated synonyms/replacement texts, location information for the natural language content may be determined and used to determine which candidates are more likely correct than others. Location information may be used to differentiate between different meanings for the same homophone, synonym, or replacement text as attributed by persons in that particular location. For example, the same term may have different meanings depending on which geographical location the author, user, or the natural language content itself is associated with, e.g., the term "lift" means "to elevate" in the United States, while in the United Kingdom, this term may also mean "an elevator" or similarly, the term "boot" in the United States is a type of footwear while in the United Kingdom a "boot" may also be the trunk of a car. Similar distinctions may be performed within country boundaries, such as with regard to geographical regions within a country, e.g., the term "wicked" in Boston may mean "cool" whereas in North Carolina it means "evil."

The differences in these colloquialisms may be identified using location information either present in the metadata associated with the natural language content itself, e.g., a publication location or source location for the natural language content, associated with the user/author as indicated in a user profile data structure 142 of a user profile repository 140 via the user profile/history analysis engine 128, via a location determination system, such as a global positioning system, location triangulation system, etc. (not shown), or the like. Such location determination systems may be built into the client computing devices from which natural language content is received, for example, e.g., most modern mobile computing devices, phones, and the like, have some form of global positioning system associated with them. Based on the determined location, and location information associated with the different homophones, synonyms, or replacement text as may be indicated in the homophone/synonym repository 126, a confidence score may be increased for homophones, synonyms and/or replacement text that match the location associated with the natural language content and/or the user/author.

As another factor that may be evaluated when determining confidence scoring of candidate homophones, synonyms, and/or replacement text, the user profile/history analysis engine 128 may further evaluate a history data structure associated with the user/author, such as via their user profile in which such a history data structure may be stored, to identify patterns of natural language used by the user/author. This history data structure 144 of the user profile data structure 142 may comprise an index of terms and a corresponding count of each of the terms used by the user/author over a predetermined prior period of time, and may be reset at the expiration of a period of time so as to maintain the counts current to the user/author's current language usage. Each term, or subset of terms deemed to be of importance, e.g., verbs and nouns, but not articles such as "the" or "a", used by the user/author in natural language content generated by the user/author may have an associated count indicating how often that user/author uses the term. These terms may be matched to the candidate homophones, synonyms, and/or replacement text to identify matches. If there is a match, and the count for that term meets or exceeds a predetermined threshold amount of usage by the user/author, then the confidence score for that matching homophone, synonym and/or replacement text may be increased as this is preferred by the user/author. If there is a match, and the count for that term does not meet or exceed the predetermined threshold, then the confidence score for that homophone, synonym, and/or replacement text is not modified based on this factor.

It should be appreciated that the history data structure 144 may also be provided in different embodiments as a separate data structure from the user profile 142 and may in fact be more of a personalized dictionary for the user/author. That is, the history data structure 144 may be provided as a dictionary data structure associated with an application used by the user/author, e.g., a word processing application, social networking website, or the like. The user profile 142 may specify preferences of the user/author for a particular personalized dictionary or other preferences as to what information should be utilized to perform confidence scoring for homophone/synonym based clarification of natural language content authored or otherwise generated by the user/author. These preferences may be accessed by the user profile/history analysis engine 128 and used to customize the confidence scoring to the particular user/author.

Thus, various confidence scoring factors may be evaluated to differentiate one candidate from another and facilitate selection of the "best" candidate based on the highest confidence score. Any combination of these confidence factors may be utilized when scoring each candidate's confidence. Of course, there may be other factors that may be evaluated as well in addition to, or in replacement of, one or more of these factors described above. Any factors that are a measure of the confidence in the correctness of a candidate homophone, synonym, and/or replacement text may be utilized without departing from the spirit and scope of the present invention.

The modified natural language content generated in the above example embodiment through the replacement of the original homophone instance with clarifying text, e.g., a highest confidence score ranked synonym or replacement text associated with a homophone in the set of candidate homophones, may be output and/or used to replace the original natural language content in the environment in which the natural language content is present, e.g., in a corpus, on a website post, in an instant message or text message, in a document being authored, or the like. Alternatively, the modified natural language content may be stored as an annotation or metadata to the original natural language content for purposes of use by automated systems, such as a natural language processing system, cognitive system, or the like, as further features for extraction or a basis for understanding the meaning of the original natural language content.

The utilization of the modified natural language content output by the homophone modification/notification engine 132, may be automatic or may be semi-automatic. In a semi-automatic implementation, the output may be in the form of a notification that is provided to a user or author of the natural language content indicating the presence of the original homophone instance and providing clarifying information for the identified original homophone instance, which in this embodiment would be a notification of a candidate replacement for the original homophone instance in the natural language content. If the user selects to do so, the candidate replacement may be implemented prior to the utilization of the modified natural language content. For example, a user may be notified that the term "rode" in the above example is a homophone for which a suggested replacement term is "drove" and if the user accepts the suggestion, the term "rode" is replaced with "drove" prior to the resulting modified natural language content being utilized or stored, e.g., prior to posting to a social networking website, sending of an instant message, or storage of the document.

As noted above, replacement of the original homophone instance identified is not the only clarifying action that may be performed. As touched upon above, the clarifying action may involve outputting a notification to a user or author of the natural language content to inform them of the homophone that is detected to be present and potential clarifications for that homophone. This notification may comprise highlighting or otherwise making conspicuous the identified original homophone instance and associating with this identified homophone instance one or more clarification messages and/or user selectable clarifying options. For example, in the case that one or more alternative homophones are present in the set of homophones associated with the original homophone instance, these other alternative homophones and/or synonyms/replacement text may be presented as alternative forms of the original natural language content for possible selection by the user/author for replacement of the original natural language content or for inclusion as metadata or annotations for the original natural language content.

It is possible that the original homophone instance is determined to be incorrect, such as by evaluating whether there is a synonym for that homophone in the natural language content and determining that a pairing exists, e.g., "the car road down the street" where the homophone "road" has a synonym "street" in the natural language content. In addition, it may be the case that no other alternative homophone or clarifying text is able to be identified with sufficient confidence as to warrant a notification of a suggestion or an automatic replacement. In such a case that the original homophone instance is determined to be incorrect, in accordance with some illustrative embodiments, the resulting clarifying action may comprise generating an output notification to the user/author indicating the definition or meaning of the original homophone instance used, as may be obtained from a dictionary resource data structure 134 or the like, and indicating a potential incorrect usage of the homophone instance, e.g., "the term "road" means to "a surface upon which wheeled vehicles travel" and may be an incorrect usage in this instance."

In some illustrative embodiments, the clarifying action may comprise providing metadata that may or may not, depending on the particular embodiment, be displayed to a user that indicates the definition (or meanings) of the homophone used in the natural language content, and other homophones and their definitions (or meanings) that may be used in place of the homophone actually used. In some illustrative embodiments, the homophone with the highest probability of correctness may be highlighted or otherwise indicated in the display, based on a determination of the pairings as noted above. In the case of a displayed set of homophones and definitions, a user selection may be facilitated such that the user may select which homophone is the correct one to use.

In some illustrative embodiments, the clarifying action may be to convert the candidate modified natural language content to an audible output, such as converting text to speech, and outputting the audible output to a user. This may be done for each potential homophone of the particular term utilized in the natural language content. For example, using the example sentence "The car rode down the street", where "rode" is a homophone for "road" and the homophone "road" is a synonym for "street", both the sentence "The car drove down the street" and "The car travel surface down the street" may be output for selection of the correct version of the sentence that the user intends. In some illustrative embodiments, rather than outputting the audible output of alternatives of the sentence using replacement text for the term where the replacement text corresponds to different homophones, the audible output may instead be an audible output of proper usage examples of the actual term (homophone) used in the original natural language content, e.g., for the sentence "The car rode down the street", other sentences in which the term "rode" is properly used may be output, e.g., "the boy rode his bike", "the jockey rode the race horse", "the train rode along the railroad track," etc.

The cognitive system 100 may provide any of a plurality of different types of natural language processing and/or cognitive computing operations which operate on natural language content. As such, the mechanisms of the illustrative embodiments improve the operation of the cognitive system 100 at least by improving the natural language content upon which the cognitive system 100 operates. That is, by removing ambiguity and erroneous homophone usage in the natural language content itself, the subsequent operations performed on the natural language content, such as natural language processing operations, cognitive computing operations, and the like, in addition to just making the natural language content more clear to a reader, are made more accurate. It should be appreciated that in embodiments where the cognitive system 100 performs a cognitive computing operation, such a cognitive computing operation may include question answering and/or request processing based on a natural language processing of the natural language content and a natural language question or request. In such embodiments, the homophone clarification operations of the illustrative embodiments may be applied to the natural language question or request, the natural language content of a corpus used to provide answers or results for answering the natural language question or responding to the request, or both. The clarified natural language content, i.e. the modified natural language content, may be provided to the request processing pipeline 108, which may be a QA pipeline for example, for processing. Thus, the mechanisms of the illustrative embodiments may operate as pre-processing mechanisms for pre-processing the natural language content for more accurate processing by the request processing pipeline 108 due to the clarification of homophone usage in the natural language content.

In some illustrative embodiments, however, the cognitive computing operations may perform cognitive operations on natural language content without a specific request or question being posed. For example, a checker operation may be performed to check natural language content for various characteristics, such as readability, clarity, correct spelling and grammar, classification, annotation, or any other operation that requires proper understanding of the natural language content. This checker operation may be performed with regard to natural language content being submitted, or received from, a client computing device and may operate, for example, as a pre-processing of the natural language content before forwarding the natural language content to a final destination, whether that be another client computing device, a social networking website, a blog post or other website post, or the like. Thus, for example, a user may submit a portion of natural language content for posting to a website, or for transmission to another computing device, such as in the case of an instant message, email, or the like, and the mechanisms of the illustrative embodiments may operate as a checker for checking the homophone usage in the portion of natural language content before the operation is completed, e.g., before the natural language content is posted to the website or transmitted to the other device, such that appropriate clarification of homophones used in the natural language content may be performed.

As noted above, the illustrative embodiments operate on natural language content represented in a textual manner in electronic data within a computing environment. The source of such natural language content may take many different forms. As noted above, one form is pre-stored corpus of natural language content, such as electronic documents, textual content of websites, blog posts, or any other composition of electronically stored textual content. Another form may be dynamically generated natural language content, such as instant messages, such as tweets generated via the Twitter™ application, generally known instant messaging applications present on most modern smart phone devices, or other instant messaging application, electronic mail, or the like. Thus, the natural language content may be sourced from a variety of different devices including databases, mobile computing devices, client computers, server computers, or the like. For example, in FIG. 1, the client computing devices 110-112 may comprise personal computers or workstations, portable computing devices, mobile communication devices with computing capability, or any other computing device that has the capability of submitting natural language content for processing by the HSIR engine 120. In addition, the HSRI engine 120 may operate on natural language content present in one or more databases, such as represented as corpus 106 in FIG. 1, and/or server computing devices, such as servers 104A-D.

In some cases, the mechanisms of the illustrative embodiments may be implemented on a stand-alone computing device, such as in one or more of the client computing devices 110-112, in which the mechanisms may be used to perform cognitive operations on natural language content generated or stored on the stand-alone computing device. For example, the mechanisms of the illustrative embodiments may be implemented on a stand-alone computing device, e.g., client computing device 110 to perform a cognitive checker operation for checking clarity of natural language content with regard to homophone usage as part of a natural language processing operation. The natural language processing operation may be associated with an application executing on the stand-alone computing device, such as a word processing application, electronic mail application, web browser application, instant messaging application, or any other application through which natural language content is generated.

In some illustrative embodiments, the mechanisms of the illustrative embodiments operate dynamically as a user is composing the natural language content. Thus, for example, as a user (author) enters natural language text, each of the terms entered are dynamically checked by the HSIR engine 120, which may be implemented in the client computing device, e.g., mobile smart phone 110, as they are entered, to determine if the term is a homophone. In response to the homophone identification engine 122 of the HSIR engine 120 detecting a homophone, i.e. the original homophone instance in the natural language content, the synonym identification engine 124 may dynamical monitor the additional text entered by the user for instances of synonyms to one or more of the synonym lists associated with the original homophone instance and its associated homophones as retrieved from the homophone/synonym repository 126. The HSIR engine 120 would operate in a similar manner as discussed previously with regard to one or more of the illustrative embodiments, with the primary difference being that the HSIR engine 120 is operating dynamically as natural language content is being composed or generated by the user. As noted previously, this generation or composition may be either via the user/author entering the natural language text directly using a keyboard of the client computing device 110, electronic pen or touch pad with an application interpreting pen, finger, or other writing implement strokes, spoken input that is converted by a speech to text conversion application to a textual representation, or any other mechanism for generating natural language content as text.

Thus, the illustrative embodiments provide mechanisms for clarifying the use of homophones in natural language content based on the detection of synonyms present in the natural language content. Some illustrative embodiments may further make use of supplemental information associated with the user, author, or source of the natural language content to assist in performing the clarification by selecting an appropriate homophone, synonym, and/or replacement text based on the supplemental information and the synonyms present in the natural language content. The clarifying of the homophone facilitates correction of text when incorrect homophone usage is present in the original natural language content, such as due to an incorrect speech to text conversion, incorrect translation, typographical errors, or any other reason why an incorrect usage of a homophone may exist in natural language content. The clarifying of the homophone assists subsequent natural language processing and/or cognitive computing by clarifying the text upon which such natural language processing and/or cognitive computing is performed and thus, making the subsequent processing of the natural language content more accurate as the source of error in the incorrect homophone usage is removed.

Figure 2A:
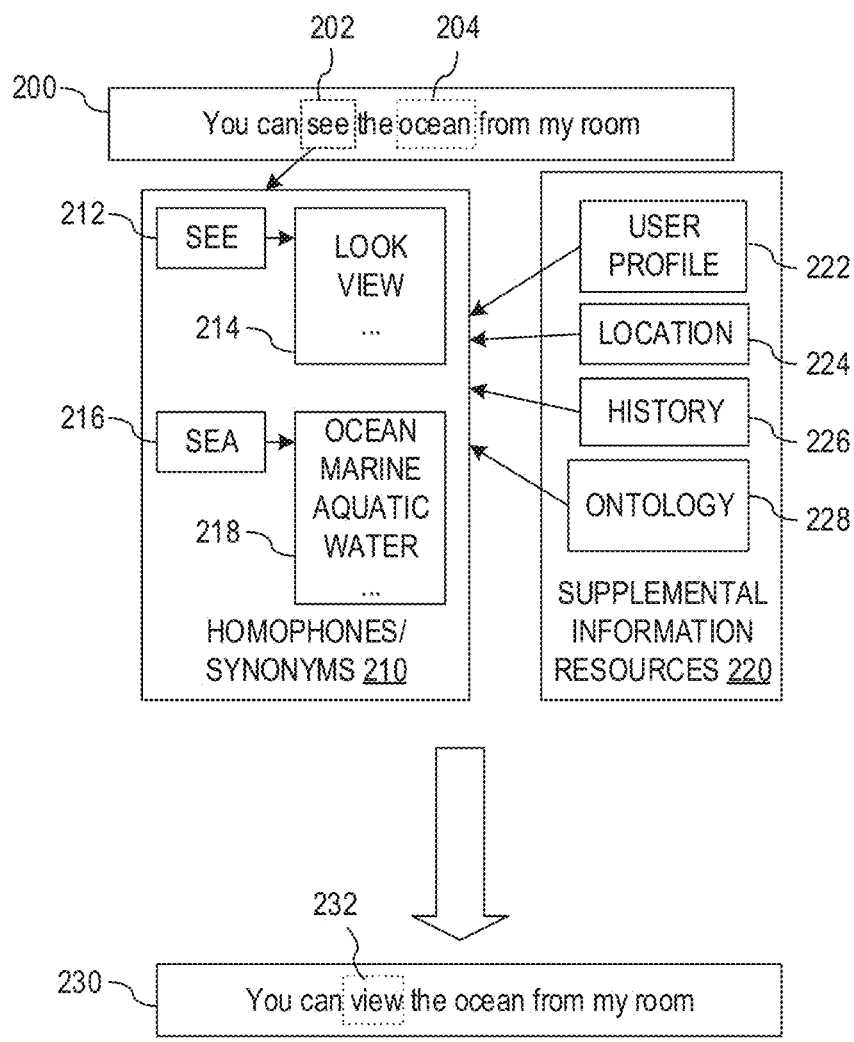
FIGS. 2A-2D illustrate examples of clarifying operations for clarifying homophone usage in accordance with one or more illustrative embodiments.
Figure 2B:
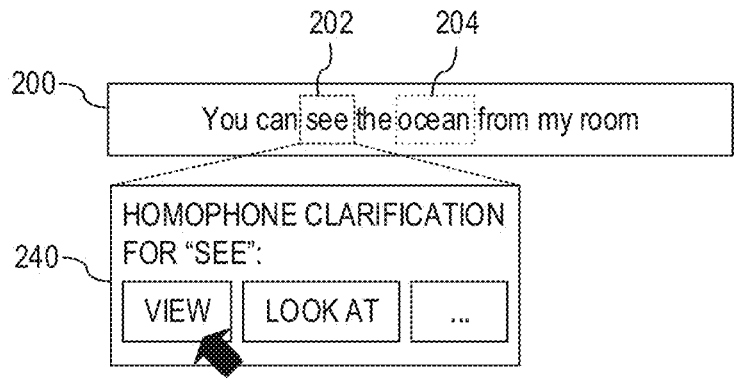
Figure 2C:
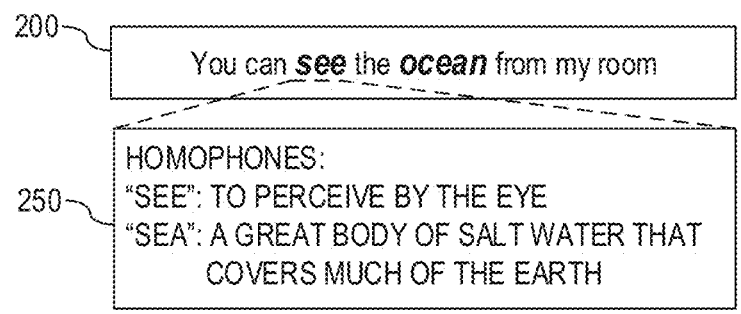
Figure 2D:
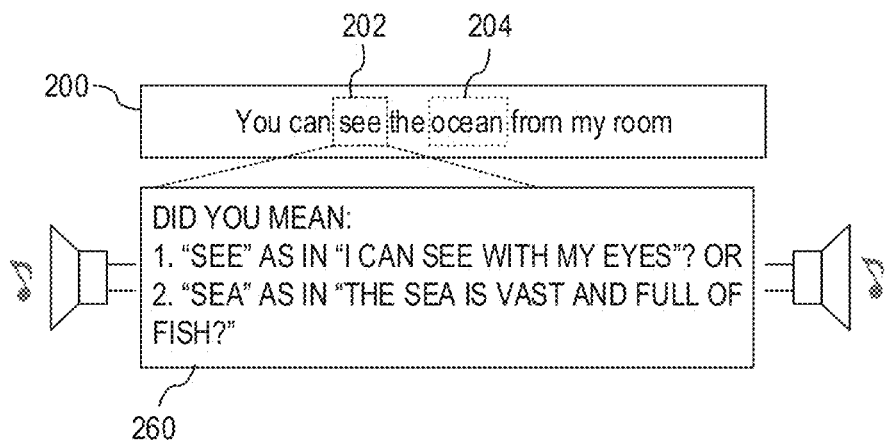
Figure 3:
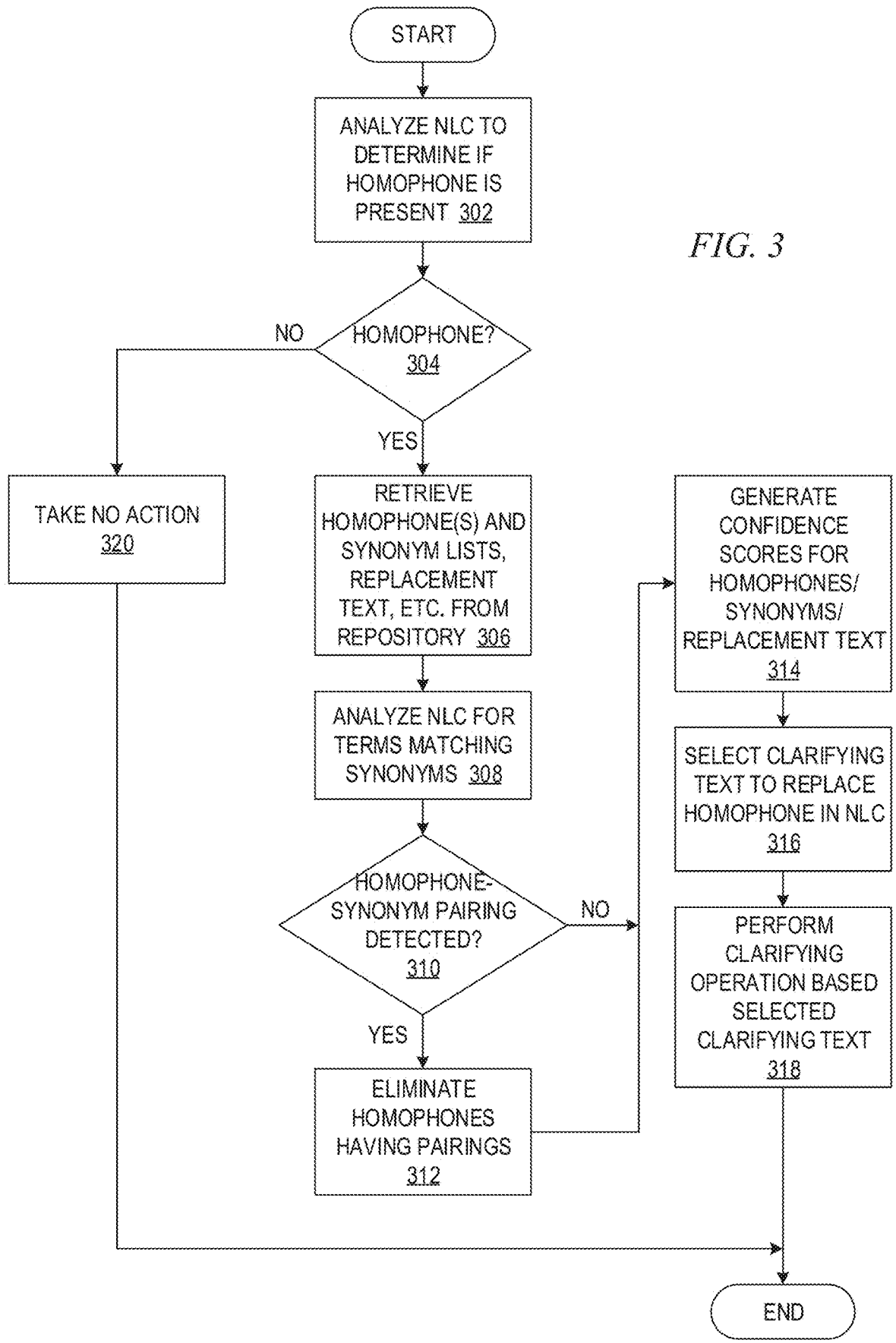
FIG. 3 is a flowchart outlining an example operation for clarifying homophone usage in natural language content in accordance with one illustrative embodiment.

FIGS. 2A-2D illustrate examples of clarifying operations for clarifying homophone usage in accordance with one or more illustrative embodiments. FIG. 2A illustrates one example in which the clarifying operation identifies replacement terms to replace an identified homophone instance with one or more words that more specifically identify the intended meaning of the identified homophone instance and actually modifying the original natural language content to replace the homophone instance with the replacement or substitute terms. FIG. 2B illustrates one example in which the clarifying operation generates an output of one or more suggestions for modifying the natural language content to clarify the use of the homophone such that the suggestions may be user selectable and a user may select the correct one to be associated with the homophone instance. FIG. 2C illustrates one example in which the clarifying operation comprises highlighting or otherwise outputting the homophone instance and/or associated homophones and/or synonym instances within the natural language content in a conspicuous manner so as to draw attention of a user and thereby prompt review/replacement of the homophone instance. FIG. 2C also shows an example in which a dictionary definition of a homophone instance may be output as part of a notification for consideration by the user. FIG. 2D illustrates an example in which the clarifying operation comprises automatically outputting an audible output of contextually accurate usage of the homophone instance and its corresponding other homophones to assist a user in understanding which homophone is the correct one for the context of the original natural language content.

In the examples shown in FIGS. 2A-2D, the same original natural language content will be used to illustrate the different possible clarifying operations which may be performed separately, or may be combined in different combinations, depending on the particular desired implementation. The original natural language content is the sentence "You can see the ocean from my room" in which the original homophone instance is determined to be the term "see" which has a corresponding homophone of "sea", and in which the term "ocean" is determined to be a synonym for the homophone "sea" which is present in the natural language content.

As shown in FIG. 2A, through operation of the mechanism of the HSIR engine 120 in FIG. 1, the term "see" 202 in the original natural language content 200 is determined to be a homophone 212 and has an associated other homophone of "sea" 216 is identified as being associated with the homophone 212 and original homophone instance 202. The homophones 212 and 216 represent a set of homophones of a homophones/synonyms memory data structure 210 that are being considered and processed as potential correct homophones for usage in the natural language content 200. Each homophone 212, 216 has an associated listing 214, 218 of synonyms for that homophone 212, 216. The homophone 212, 216 and synonym listings 214, 218 may be obtained from a homophone/synonym repository as previously described above.

The HSIR engine, such as HSIR engine 120 in FIG. 1, further analyzes the natural language content 200 to identify any terms present in the natural language content 200 that match a synonym in one of the synonym lists 214, 218. In the depicted example, the synonym "ocean" 204 is identified as being present in the natural language content 200. The presence of the synonym 204 eliminates from further consideration the homophone 216 and its corresponding list of synonyms 218 as a correct homophone for usage in the natural language content. Thus, the original homophone "see" 212 is determined to be a correct homophone for the natural language content 200.

However, in order to clarify the homophone, an replacement term is to be selected to avoid any confusion or inaccurate processing of the natural language content 200, such as by a NLP mechanism or cognitive computing system, due to the presence of the homophone 202. Thus, the HSIR engine processes the synonym listing 214 associated with the homophone 212 to select a replacement synonym for the homophone instance 202. It should be appreciated that in some embodiments, one or more specific replacement texts may be associated with the homophone 212 and thus, selection may include evaluation of the one or more specific replacement texts as well as, or alternative to, the evaluation of the synonym listing 214.

In order to evaluate the synonym listing 214, in some illustrative embodiments, each synonym may be scored according to a confidence scoring methodology which may look to the context of the natural language content 200, e.g., the other terms and concepts referenced in the natural language content, based on an ontology 228, preferences in a user profile 222 for the user/author or other source that generated the natural language content 200, location information 224 associated with the user/author or other source that generated the natural language content 200, historical term usage information 226 for the user/author or other source that generated the natural language content 200, or other supplemental information resources 220. Each synonym may have an associated confidence score generated for it using one or more of these factors, and the resulting confidence scores may be compared so as to select a highest ranking synonym based on the confidence scores. The resulting synonym (or replacement text) is then used to modify the original natural language content 200 by replacing the homophone instance 202 with the corresponding synonym or replacement text 232, and thereby generate a modified natural language content 230 that is clarified with regard to the homophone 202 and synonym 204 in the original natural language content 200. This resulting modified natural language content 230 may be provided to the final destination intended for the original natural language content 200, e.g., storage in a corpus, transmission to another computing device, posting to a website, submission to a NLP system for processing, submission to a cognitive computing system for further processing, etc.

The mechanisms described above with regard to identifying the homophone instance 202 and synonym instance 204 in the original natural language content 200 and identifying the homophone/synonym memory data structure 210 and utilizing the supplemental information resources 220 to rank the various possible clarifying synonyms and/or replacement texts may be utilized in the other depicted embodiments of FIGS. 2B-2D as well but with different clarifying operations being performed depending on the particular embodiment. For example, in FIG. 2B, rather than automatically performing the replacement of the original homophone instance 202 in the original natural language content 200 as in FIG. 2A, a suggested homophone clarification notification 240 for the correct homophone 212 is generated and output in association with the original natural language content 200. The notification 240 may comprise one or more user selectable synonyms and/or replacement text for selection by a user (as indicated by the arrow in FIG. 2B). The user may select a synonym or replacement text and, in response, the HSIR engine may then perform the replacement of the homophone instance 202 with the user selected synonym or replacement text.

In FIG. 2C, the homophone instance 202 and the identified synonym instance 204 in the original natural language content are rendered in a conspicuous manner, e.g., in the depiction these terms are bold faced, larger font, and italicized. This brings the attention of the user/author to the identified homophone and synonym instances 202, 204 for consideration for clarification by the user/author. Moreover, in some illustrative embodiments, a notification 250 having the definitions for the homophone instance 202 and its associated other homophones may be displayed for consideration by the user/author when clarifying the original natural language content 200.

In FIG. 2D, the identified homophone instance 202 and its associated other homophones are the basis for outputting an audible notification of proper homophone usage. In this case, the audible output 260 (indicated by the speaker and musical note icons in FIG. 2D), provides an audible speech of a proper sentence using the different homophones. The audible nature of this output is important in that the user/author is able to hear the similarity of the sounds of the homophones as well as discern the difference in their usage in correct sentences. In this case, both the terms "see" and "sea" will sound the same, yet the sentences that are output illustrate the different meanings of these terms, e.g., "see" refers to the viewing of something with the eyes whereas the term "sea" is directed to a body of water in which fish may live.

It should be appreciated that these are only examples of different types of clarifying operations that may be performed in embodiments of the present invention. Many other types of clarifying operations may become apparent to those of ordinary skill in the art in view of the present description and are intended to be within the spirit and scope of the present disclosure and corresponding claims. Moreover, two or more of the clarifying operations may be combined in any desired combination so as to achieve an intended purpose without departing from the spirit and scope of the present invention.

FIG. 3 is a flowchart outlining an example operation for clarifying homophone usage in natural language content in accordance with one illustrative embodiment. The operation outlined in FIG. 3 may be performed, for example, by a HSIR engine, such as HSIR engine 120 in FIG. 1. It should be appreciated that the operation outlined in FIG. 3 is only an example and is not to be considered limiting on the possible embodiments of the present invention or the claimed features set forth hereafter.

As shown in FIG. 3, the operation starts by receiving natural language content (NLC) and analyzing the NLC to determine if there is a homophone present (step 302). It should be appreciated that for purposes of illustration, this operation is described with regard to a single homophone being present in the NLC, however embodiments may operation on any number of homophones present in the NLC with the operations being repeated for each homophone instance detected. The NLC may be received and analyzed in a dynamic manner, such as during the generation of the NLC, or more statically as in the case of previously stored NLC.

A determination is made as to whether a homophone instance is detected (step 304). If no homophone is detected, then no action is taken (step 320) and the operation terminates. If a homophone instance is detected in the NLC, the corresponding homophone information is retrieved from a repository (step 306). This homophone information may comprise other homophones, synonym listings associated with homophones, and/or replacement text information, for example.

The NLC is further analyzed to determine if there are any terms in the NLC that match a synonym in the homophone information (step 308). If there is such a homophone-synonym pairing (match) detected (step 310), then that homophone and its synonyms are eliminated from further consideration in clarifying the NLC (step 312). Thereafter, or if no homophone-synonym pairing is detected in the NLC, then for the remaining homophones/synonyms in the homophone information, e.g., set of candidate homophones and corresponding synonyms/replacement text, a confidence score is calculated (step 314) and a clarifying text, e.g., a synonym or replacement text, is selected based on the calculated confidence scores (step 316). Based on the selected clarifying text, a clarifying operation is performed (step 318). The clarifying operation may be to replace the homophone instance in the NLC, output a notification, or the like. The operation then terminates.

Figure 4:
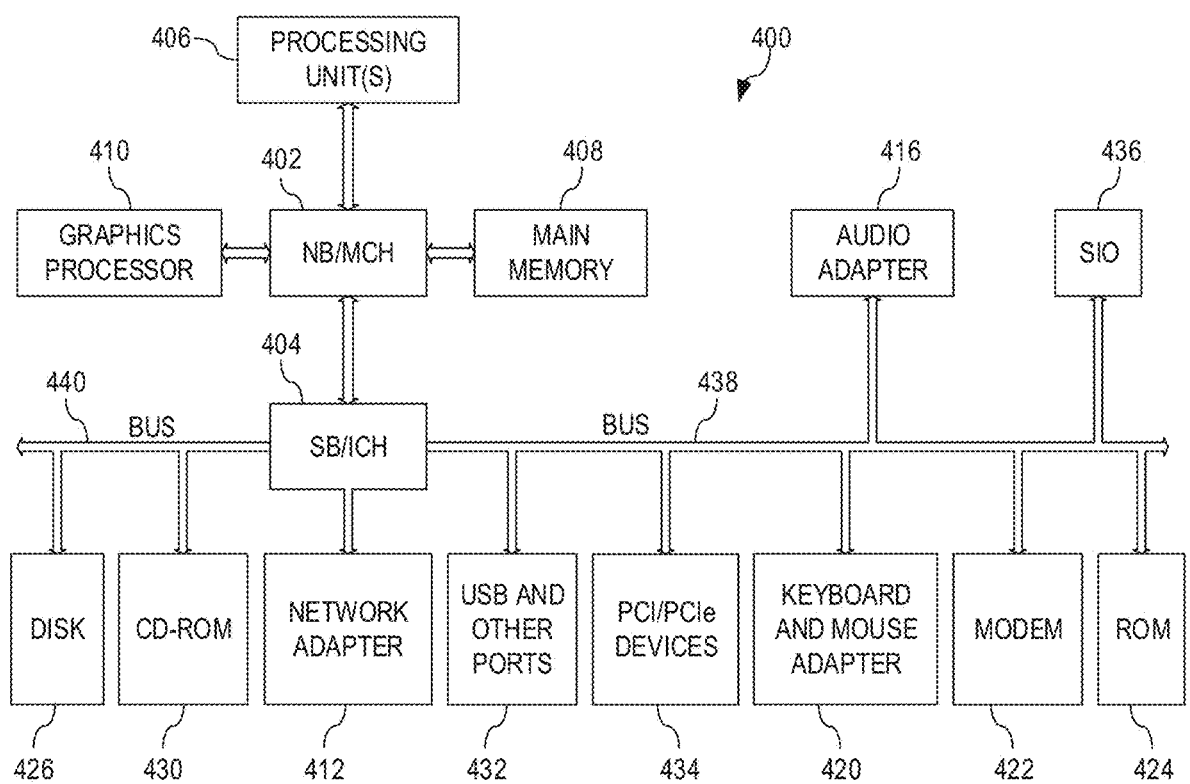
FIG. 4 is a block diagram of an example data processing system in which aspects of the illustrative embodiments are implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as server 104A or client 110 in FIG. 1, in which computer usable code or instructions implementing the processes for illustrative embodiments of the present invention are located. In one illustrative embodiment, FIG. 4 represents a server computing device, such as a server 104, which, which implements a cognitive system 100 and QA system pipeline 108 augmented to include the additional mechanisms of the illustrative embodiments described hereafter.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 204 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 204.

An operating system runs on processing unit 406. The operating system coordinates and provides control of various components within the data processing system 400 in FIG. 4. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p computer system, running the Advanced Interactive Executive (AIX®) operating system or the LINTJX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 1 and 4 may vary depending on the implementation. Other internal hardware or peripheral devices, such as flash memory, equivalent non-volatile memory, or optical disk drives and the like, may be used in addition to or in place of the hardware depicted in FIGS. 1 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
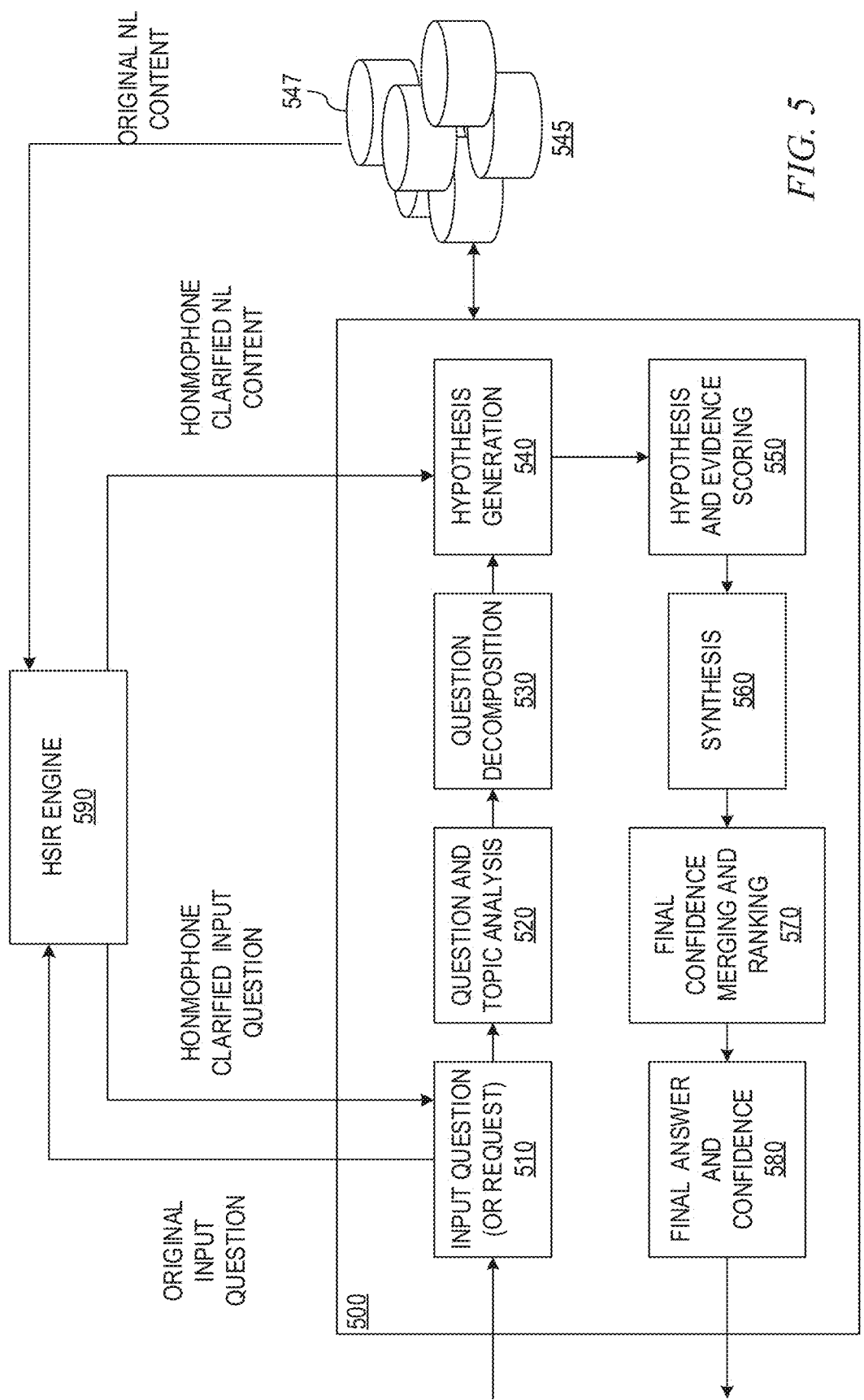
FIG. 5 illustrates a cognitive system processing pipeline for processing a natural language input to generate a response or result in accordance with one illustrative embodiment.

As previously mentioned above, the mechanisms of the illustrative embodiments may be used to improve the operation of a natural language processing system, cognitive computing system, or the like. FIG. 5 illustrates an example of a cognitive computing system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 5 may be implemented, for example, as QA pipeline 108 of cognitive system 100 in FIG. 1. It should be appreciated that the stages of the QA pipeline shown in FIG. 5 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 5 is augmented, for example, in one or more of the stages to implement the improved mechanism of the illustrative embodiments described hereafter, additional stages may be provided to implement the improved mechanism, or separate logic from the pipeline 500 may be provided for interfacing with the pipeline 500 and implementing the improved functionality and operations of the illustrative embodiments.

As shown in FIG. 5, the QA pipeline 500 comprises a plurality of stages 510-580 through which the cognitive system operates to analyze an input question and generate a final response. In an initial question input stage 510, the QA pipeline 500 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 500, i.e. the question and topic analysis stage 520, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500*s* to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 5, the identified major features are then used during the question decomposition stage 530 to decompose the question into one or more queries that are applied to the corpora of data/information 545 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 545. That is, these various sources themselves, different collections of sources, and the like, represent a different corpus 547 within the corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the corpora 545.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 540 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA pipeline 500, in stage 550, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 560, the large number of scores generated by the various reasoning algorithms are synthesized into confidence scores or confidence measures for the various hypotheses. This process involves applying weights to the various scores, where the weights have been determined through training of the statistical model employed by the QA pipeline 500 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 500 that identifies a manner by which these scores may be combined to generate a confidence score or measure for the individual hypotheses or candidate answers. This confidence score or measure summarizes the level of confidence that the QA pipeline 500 has about the evidence that the candidate answer is inferred by the input question, i.e. that the candidate answer is the correct answer for the input question.

The resulting confidence scores or measures are processed by a final confidence merging and ranking stage 570 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, are generated and output to the submitter of the original input question via a graphical user interface or other mechanism for outputting information.

As shown in FIG. 5, in accordance with one illustrative embodiment, the pipeline 500 is augmented to operate with the HSIR engine 590, which may be the HSIR engine 120 in FIG. 1, for example. While the HSIR engine 590 is shown as separate from the pipeline 500, it should be appreciated that the HSIR engine 590 may be integrated into the pipeline 500 with components of the HSIR engine 590 potentially be included in various stages of the pipeline 500, e.g., the input question stage 510, the hypothesis generation stage 540, or the like.

In the depicted example, the HSIR engine 590 operates on one or both of the natural language content (NLC) provided to the HSIR engine 590 from the input question (or request) stage 510 or the hypothesis generation stage 540. For example, the input question or request, which may be posed as a natural language question or natural language request as discussed above, may serve as the NLC upon which the HSIR engine 590 operates. The HSIR engine 590 operates in accordance with one or more of the illustrative embodiments described previously to identify homophones and synonyms present in the NLC and clarify these instances by performing a clarifying action based on the identified homophone/synonym instances and possibly ranking clarifying text according to the NLC context and/or supplemental information associated with the user/author or source of the NLC. The HSIR engine 590 may generate modified NLC, e.g., a modified input question that is clarified with regard to any identified homophone instances either through replacement of the homophone or through addition of clarifying information, such as in metadata or the like, which is input back to the pipeline 500, e.g., in stage 510, for further processing through the pipeline 500.

Similar considerations apply to NLC documentation in the corpus or corpora 545, 547 which may be input to the HSIR engine 590 as shown in FIG. 5. The NLC documentation may be input to the HSIR engine 590 which operates on it to clarify any instances of homophones detected in the NLC documentation. The HSIR engine 590 may generate modified NLC documentation which may be output to the pipeline 500, such as at stage 540 for example, for use in processing the input question and/or request. It should be appreciated that such clarification may also result in modified NLC documentation which is stored back to the corpus or corpora 545, 547 such that when that documentation is used again at a later time, such homophone clarification has already been performed and does not need to be performed again.

Thus, as detailed above, illustrative embodiments of the present invention provide mechanisms for clarifying instances of homophones in natural language content based on the presence, or lack thereof, of synonyms of homophones in the natural language content. As such, in some illustrative embodiments, the mechanisms analyze natural language content to identify a homophone instance in the natural language content, the homophone instance being a first term having a first definition and a first pronunciation for which there is a second term having the first pronunciation and a second definition different from the first definition. Moreover, the mechanisms, in response to identifying the homophone instance, analyzing, by the HSIR engine, the natural language content to identify a third term that is a synonym for the second term, where the third term has a third definition that is nearly the same as the second definition. Furthermore, the mechanism, in response to the natural language content comprising the third term, perform a clarifying operation to modify the natural language content to clarify the homophone instance and generate a modified natural language content.

In some illustrative embodiments, the clarifying operation comprises identifying a fourth term that is a synonym for the first term, wherein the fourth term has a fourth definition that has a level of correspondence to the first definition, and performing the clarifying operation based on the identified fourth term. In some illustrative embodiments, the fourth definition of the fourth term does not have a correspondence to the second definition of the second term.

In some illustrative embodiments, the fourth term is further identified based on ranking two or more synonyms for the first term based on historical data or profile data associated with an author of the natural language content. The historical data may include data indicating a preference of terms used by the author. The profile data may include at least one of user attributes or user writing style information.

In some illustrative embodiments, the fourth term is identified by ranking two or more synonyms for the first term based on location information associated with an author of the natural language content. In some illustrative embodiments, the ranking of two or more synonyms for the first term based on location information may include identifying whether or not the first term is a colloquialism associated with a location corresponding to the location information, and ranking the two or more synonyms based on results of identifying whether or not the first term is a colloquialism.

In some illustrative embodiments, the clarifying operation may include accentuating the first and second terms in an output of the natural language content. In some illustrative embodiment, the clarifying operation may include at least one of: accentuating the first and second terms in an output of the natural language content, outputting a notification of the fourth term in association with the first term as an alternative to the first term, outputting a notification of a definition or meaning of the first term and indicating a potential incorrect usage of the first term, automatically replacing the first term with the fourth term, associating metadata with the natural language content that identifies the first term and second term as homophones and providing the first and second definitions, converting the natural language content to an audible output specifying the fourth term and one or more synonyms of the second term as alternatives for the first term, or outputting audible output indicating examples of proper usage of the first term and second term in corresponding example natural language content.

In some illustrative embodiments, the mechanisms further operate to perform a natural language processing operation on the modified natural language content. The natural language processing operation may include parsing the modified natural language content and performing an operation based on one or more concepts associated with the clarified homophone specified in the modified natural language content. In some illustrative embodiments, the natural language processing operation is one of a translation operation, a natural language based search operation, a natural language content correctness checking operation, or a natural language question answering operation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a homophone/synonym identification/replacement (HSIR) engine, the method comprising:

analyzing, by the HSIR engine executing on the processor of the data processing system, natural language content to identify a homophone instance in the natural language content, the homophone instance being a first term having a first definition and a first pronunciation for which there is a second term having the first pronunciation and a second definition different from the first definition;

in response to identifying the homophone instance, analyzing, by the HSIR engine, the natural language content to identify a third term that is a synonym for the second term, wherein the third term has a third definition that is nearly the same as the second definition;

in response to the natural language content comprising the third term, performing, by the HSIR engine, a clarifying operation to modify the natural language content to clarify the homophone instance and generate a modified natural language content; and performing, by a natural language processing computer system, a computer natural language processing operation on the modified natural language content, wherein the computer natural language processing operation comprises the natural language processing computer system parsing the modified natural language content to extract features of the modified natural language content and performing an operation based on one or more concepts associated with the clarified homophone specified in the modified natural language content, wherein the clarifying operation comprises:

identifying a fourth term that is a synonym for the first term, wherein the fourth term has a fourth definition that has a level of correspondence to the first definition; and performing the clarifying operation based on the identified fourth term, and wherein the clarifying operation further comprises at least one of:

accentuating the first and second terms in an output of the natural language content, outputting a notification of the fourth term in association with the first term as an alternative to the first term, outputting a notification of a definition or meaning of the first term and indicating a potential incorrect usage of the first term, automatically replacing the first term with the fourth term, associating metadata with the natural language content that identifies the first term and second term as homophones and providing the first and second definitions, converting the natural language content to an audible output specifying the fourth term and one or more synonyms of the second term as alternatives for the first term, or outputting audible output indicating examples of proper usage of the first term and second term in corresponding example natural language content.

2. The method of claim 1, wherein the fourth definition of the fourth term does not have a correspondence to the second definition of the second term.

3. The method of claim 1, wherein identifying the fourth term further comprises ranking two or more synonyms for the first term based on historical data or profile data associated with an author of the natural language content, wherein the historical data comprises data indicating a preference of terms used by the author, and wherein the profile data comprises at least one of user attributes or user writing style information.

4. The method of claim 1, wherein identifying the fourth term further comprises ranking two or more synonyms for the first term based on location information associated with an author of the natural language content.

5. The method of claim 4, wherein ranking two or more synonyms for the first term based on location information comprises identifying whether or not the first term is a colloquialism associated with a location corresponding to the location information, and ranking the two or more synonyms based on results of identifying whether or not the first term is a colloquialism.

6. The method of claim 1, wherein the clarifying operation comprises accentuating the first and second terms in an output of the natural language content.

7. The method of claim 1, wherein the computer natural language processing operation is one of a translation operation, a natural language based search operation, a natural language content correctness checking operation, or a natural language question answering operation.

8. A computer program product comprising a computer readable storage medium having a computer readable program stored therein, wherein the computer readable program, when executed on a computing device, causes the computing device to implement a homophone/synonym identification/replacement (HSIR) engine that operates to:

analyze, by the HSIR engine, natural language content to identify a homophone instance in the natural language content, the homophone instance being a first term having a first definition and a first pronunciation for which there is a second term having the first pronunciation and a second definition different from the first definition;

analyze, by the HSIR engine, in response to identifying the homophone instance, the natural language content to identify a third term that is a synonym for the second term, wherein the third term has a third definition that is nearly the same as the second definition;

perform, by the HSIR engine, in response to the natural language content comprising the third term, a clarifying operation to modify the natural language content to clarify the homophone instance and generate a modified natural language content; and perform, by a natural language processing computer system, a computer natural language processing operation on the modified natural language content, wherein the computer natural language processing operation comprises the natural language processing computer system parsing the modified natural language content to extract features of the modified natural language content and performing an operation based on one or more concepts associated with the clarified homophone specified in the modified natural language content, wherein the clarifying operation comprises:

identifying a fourth term that is a synonym for the first term, wherein the fourth term has a fourth definition that has a level of correspondence to the first definition; and performing the clarifying operation based on the identified fourth term, and wherein the clarifying operation further comprises at least one of:

accentuating the first and second terms in an output of the natural language content, outputting a notification of the fourth term in association with the first term as an alternative to the first term, outputting a notification of a definition or meaning of the first term and indicating a potential incorrect usage of the first term, automatically replacing the first term with the fourth term, associating metadata with the natural language content that identifies the first term and second term as homophones and providing the first and second definitions, converting the natural language content to an audible output specifying the fourth term and one or more synonyms of the second term as alternatives for the first term, or outputting audible output indicating examples of proper usage of the first term and second term in corresponding example natural language content.

9. The computer program product of claim 8, wherein the fourth definition of the fourth term does not have a correspondence to the second definition of the second term.

10. The computer program product of claim 8, wherein identifying the fourth term further comprises ranking two or more synonyms for the first term based on historical data or profile data associated with an author of the natural language content, wherein the historical data comprises data indicating a preference of terms used by the author, and wherein the profile data comprises at least one of user attributes or user writing style information.

11. The computer program product of claim 8, wherein identifying the fourth term further comprises ranking two or more synonyms for the first term based on location information associated with an author of the natural language content.

12. The computer program product of claim 11, wherein ranking two or more synonyms for the first term based on location information comprises identifying whether or not the first term is a colloquialism associated with a location corresponding to the location information, and ranking the two or more synonyms based on results of identifying whether or not the first term is a colloquialism.

13. The computer program product of claim 8, wherein the clarifying operation comprises accentuating the first and second terms in an output of the natural language content.

14. An apparatus comprising:
a processor; and
a memory coupled to the processor, wherein the memory comprises instructions which, when executed by the processor, cause the processor to implement a homophone/synonym identification/replacement (HSIR) engine that operates to:

analyze, by the HSIR engine, natural language content to identify a homophone instance in the natural language content, the homophone instance being a first term having a first definition and a first pronunciation for which there is a second term having the first pronunciation and a second definition different from the first definition;

analyze, by the HSIR engine, in response to identifying the homophone instance, the natural language content to identify a third term that is a synonym for the second term, wherein the third term has a third definition that is nearly the same as the second definition;

perform, by the HSIR engine, in response to the natural language content comprising the third term, a clarifying operation to modify the natural language content to clarify the homophone instance and generate a modified natural language content; and perform, by a natural language processing computer system, a computer natural language processing operation on the modified natural language content, wherein the computer natural language processing operation comprises the natural language processing computer system parsing the modified natural language content to extract features of the modified natural language content and performing an operation based on one or more concepts associated with the clarified homophone specified in the modified natural language content, wherein the clarifying operation comprises:

identifying a fourth term that is a synonym for the first term, wherein the fourth term has a fourth definition that has a level of correspondence to the first definition; and performing the clarifying operation based on the identified fourth term, and wherein the clarifying operation further comprises at least one of:

accentuating the first and second terms in an output of the natural language content, outputting a notification of the fourth term in association with the first term as an alternative to the first term, outputting a notification of a definition or meaning of the first term and indicating a potential incorrect usage of the first term, automatically replacing the first term with the fourth term, associating metadata with the natural language content that identifies the first term and second term as homophones and providing the first and second definitions, converting the natural language content to an audible output specifying the fourth term and one or more synonyms of the second term as alternatives for the first term, or outputting audible output indicating examples of proper usage of the first term and second term in corresponding example natural language content.

* * * * *